US008494567B2

(12) United States Patent
Lorgeoux et al.

(10) Patent No.: US 8,494,567 B2
(45) Date of Patent: Jul. 23, 2013

(54) METHOD FOR SELECTING AN EFFECTIVE ANGLE OF RECEPTION OF A DIRECTIONAL ANTENNA OF A RECEIVER NODE, CORRESPONDING STORAGE MEANS AND RECEIVER NODE

(75) Inventors: Mikael Lorgeoux, Rennes (FR); Alain Caillerie, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 509 days.

(21) Appl. No.: 12/635,274

(22) Filed: Dec. 10, 2009

(65) Prior Publication Data
US 2010/0167769 A1   Jul. 1, 2010

(30) Foreign Application Priority Data
Dec. 11, 2008   (FR) ..................... 08 58486

(51) Int. Cl.
*H04W 24/00* (2009.01)
*H04W 4/00* (2009.01)
*H04B 7/00* (2006.01)
*H04B 7/02* (2006.01)
*H04M 1/00* (2006.01)
*G01S 5/04* (2006.01)
*G01S 3/02* (2006.01)
*H04K 1/10* (2006.01)
*H04L 27/28* (2006.01)
*H04L 7/02* (2006.01)
*H04L 27/00* (2006.01)

(52) U.S. Cl.
USPC .............. 455/500; 455/456.1; 455/562.1; 342/432; 342/458; 370/334; 375/260; 375/267; 375/295

(58) Field of Classification Search
USPC ............. 455/11.1, 13.1, 25, 41.2, 63.4, 101, 455/103, 134, 450, 456.1, 500, 504, 5, 506, 455/522, 562.1; 342/359, 367, 377, 432, 342/441, 442, 450, 453; 370/334; 375/260, 375/267, 295, 299, 347, 348, 349
See application file for complete search history.

(56) References Cited

U.S. PATENT DOCUMENTS

| 5,960,350 | A  |   | 9/1999  | Schorman et al. ............ 455/450 |
| 6,459,903 | B1 | * | 10/2002 | Lee ............................. 455/456.1 |
| 6,498,939 | B1 |   | 12/2002 | Thomas ........................ 455/562 |
| 8,244,174 | B1 | * | 8/2012  | Kong ............................. 455/25 |

(Continued)

FOREIGN PATENT DOCUMENTS

| EP | 1659813 | 5/2006 |
| EP | 1845584 | 10/2007 |

(Continued)

*Primary Examiner* — Andrew Wendell
*Assistant Examiner* — Paul P Tran
(74) *Attorney, Agent, or Firm* — Fitzpatrick, Cella, Harper & Scinto

(57) ABSTRACT

It is proposed a method for selecting an effective angle of reception of a directional antenna of a receiver node, the receiver node belonging to a wireless communications network comprising a plurality of emitter nodes.

The method is implemented by the receiver node and comprises steps of:
 determining at least two possible angles of reception associated with a first emitter node, and
 for each of said at least two possible angles of reception, determining a difference between that angle and an angle of reception associated with a second emitter node different from said first emitter node, and selecting the effective angle of reception from among said at least two possible angles of reception associated with said first emitter node as a function of the determined differences.

9 Claims, 9 Drawing Sheets

U.S. PATENT DOCUMENTS

| | | | |
|---|---|---|---|
| 2004/0053634 A1* | 3/2004 | Gainey et al. | 455/522 |
| 2005/0285784 A1* | 12/2005 | Chiang et al. | 342/359 |
| 2007/0291870 A1* | 12/2007 | Ponnekanti | 375/295 |
| 2008/0316105 A1* | 12/2008 | Seong et al. | 342/442 |
| 2009/0004967 A1* | 1/2009 | Anderson | 455/13.1 |
| 2009/0073041 A1* | 3/2009 | Ferreol et al. | 342/441 |

FOREIGN PATENT DOCUMENTS

| | | |
|---|---|---|
| EP | 1956732 | 8/2008 |
| FR | 2757004 A | 6/1998 |
| WO | WO 03/094285 A | 11/2003 |
| WO | WO 2006/006117 A | 1/2006 |

\* cited by examiner

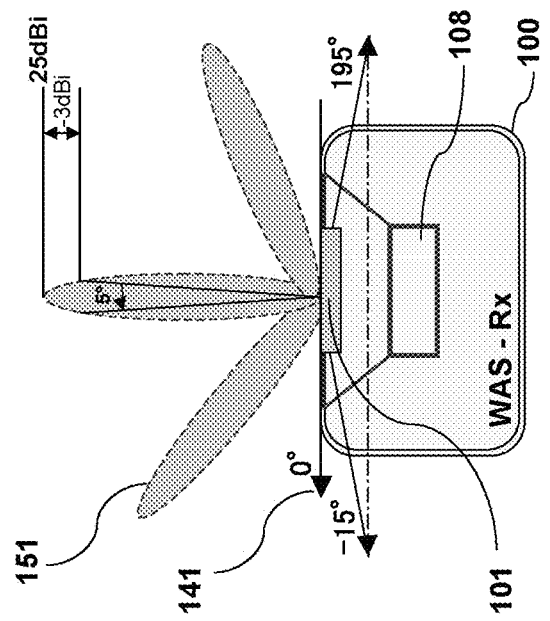
Figure 2b – Receive antenna
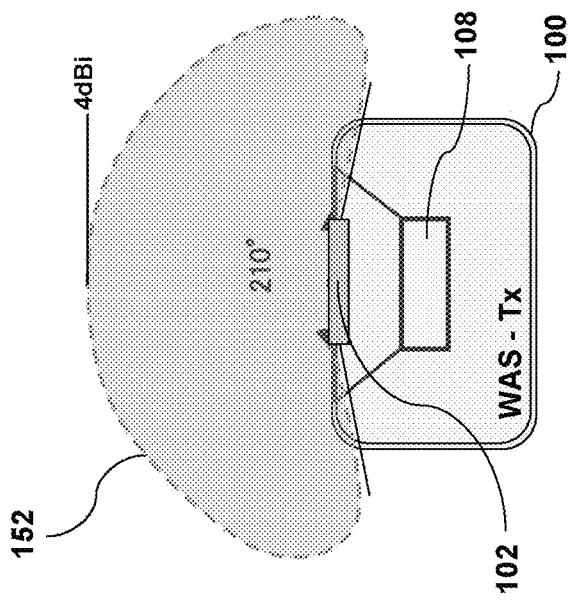
Figure 2a – Sending antenna

Figure 6

| Receive node | Sender nodes | | | | | | | | |
|---|---|---|---|---|---|---|---|---|---|
| WAS 100 | WAS 200 | WAS 300 | WAS 400 | WAS 500 | WAS 600 | WAS 700 | WAS 800 | WSC 900 | |
| | A1 | B1 | C1 | D1 | E1 | F1 | G1 | H1 | ← 11 |
| | A2 | B2 | C2 | D2 | E2 | F2 | G2 | H2 | ← 12 |
| | A3 | B3 | C3 | D3 | E3 | F3 | G3 | H3 | ← 13 |

10

METHOD FOR SELECTING AN EFFECTIVE ANGLE OF RECEPTION OF A DIRECTIONAL ANTENNA OF A RECEIVER NODE, CORRESPONDING STORAGE MEANS AND RECEIVER NODE

1. FIELD OF THE DISCLOSURE

The field of the disclosure is that of wireless personal area networks (WPANs) or home communications networks, for example of the mesh type, comprising a plurality of nodes each having for example a reception antenna and an emission antenna.

The disclosure pertains especially but not exclusively to such networks which use millimeter wave radio-frequency (or RF) bands, namely wavebands around 60 GHz.

2. BACKGROUND OF THE DISCLOSURE

Wireless applications are now increasingly numerous. Such applications (for example of the audio and/or video type) require very high bit rates (of the order of one gigabit per second) working up to distances of about 10 meters.

60 GHz radio transmission systems are particularly well suited to data transmission at very high bit rates within a limited radius. Indeed, since air attenuates millimeter RF waves (following physical laws well-known to those skilled in the art), the range is limited to about 10 meters.

Generally, communications networks based on wireless technology using the millimeter RF waveband, i.e. wavebands around 60 GHz, comprise a plurality of nodes having for example a smart reception antenna and a smart emission antenna. Smart antennas are antennas with positive gain that can be used to obtain sufficient radio range without needing to emit at unauthorized power values.

A smart antenna generally consists of a network of radiating elements distributed in matrix form on a support. This type of antenna enables the use of a technique known as beam forming. In this technique, it is possible to control the radiation pattern of the antenna (when emitting and/or when receiving) as well as the orientation of the direction of the radiation pattern by tuning the amplitude and phase of the radio signals (emitted and/or received) by each radiating element of the antenna.

In a classic 60 GHz wireless communication network, the nodes communicate with one another along direct lines of sight (LOS). This maintains a high level of quality of service.

The 60 GHz radio channel is a particularly random transmission channel. This type of channel is especially sensitive to shadowing caused for example by an individual or object that is in the direct line of sight between two nodes of the network. In such a situation, any communication between these two nodes is impossible.

There are several known techniques for minimizing deterioration related to shadowing.

A first prior art technique consists of the use of secondary communications paths.

The term "secondary communications path" is understood to mean a path obtained by reflection on one or more obstacles (such as for example walls, furniture etc). These secondary communications paths are independent and distinct of the direct lines of sight.

This first prior art technique is especially present in the U.S. Pat. No. 6,498,939. This document describes a 60 GHz radio communications network comprising a server with a smart emission antenna and a client having a smart reception antenna. Thus, it is possible to define several distinct communications paths between the server and the client by tuning the antenna orientation in emission and in reception.

The communication network implements a main radio channel using frequencies around 60 GHz through which the server and the client exchange high bit-rate data and a secondary radio channel through which the server and client exchange low bit-rate data.

The data exchanged on the secondary radio channel are control data elements such as for example antenna orientation data, radio signal quality data etc.

The secondary radio channel enables the client and the server to determine the bit error rate (BER) on the main radio channel for various antenna orientations in emission and in reception.

In this first prior art technique, the antenna orientations chosen for the communications on the main radio channel are emission antenna orientations and reception antenna orientations giving the best bit error rate of the moment. Thus, if the direct line of sight is free (with no shadowing), the choice of orientation of the antennas will correspond to the direct line of sight between the server and the client. By contrast, if the direct line of sight is shadowed by an obstacle, the choice of orientation of the antennas will correspond to a secondary communication network.

This first prior art technique has a certain number of drawbacks.

First of all, this technique calls for the implementation of a main radio channel, a secondary radio channel and a bit error rate measurement mechanism for measuring the bit error rate on the main radio channel. This is particularly complex and costly.

Furthermore, to ensure optimal quality of service, the measurements of bit error rate on the main radio channel should be done constantly. The bit error rate measurement mechanism therefore proves to be costly in terms of computation power and electrical power supply.

Furthermore, the switching to new antenna orientations may temporarily downgrade the quality of service of the application.

A second prior art technique lies in the use of a mesh technique.

In a mesh network, all the nodes of the network communicate with each other by distinct radio paths. This type of network enables the introduction of spatial diversity and an increase in data redundancy. Thus the mesh technique improves the reliability of communications between the different nodes of the network.

The use of the mesh technique in a wireless network makes it possible to multiply the data reception paths for each of the nodes of the network. Thus, each node receives several copies of a same piece of data through different reception paths. The different copies are compared to detect errors and then as the case may be these errors are corrected by means for an appropriate error correction code.

In general, a wireless mesh network implements a TDM (Time Division Multiplexing) type transmission protocol. The TDM protocol consists in sharing the transmission time between the different nodes of the network. More specifically, each node is a sender during a predetermined time slot and is a receiver during all the other time slots. Here below in this document, the term "frame" (or "speech time") refers to a time interval or time slot during which a given node sends information, and the term "super frame" (or "TDM sequence") refers to the concatenation of all the frames of a TDM cycle.

Wireless mesh networks are especially well suited to connectivity between the different elements of a home cinema.

Here below, the description is situated in the context of a 7.1 type wireless home cinema system, i.e. an eight-channel audio system.

For example, the 7.1 wireless home cinema system is laid out in a room of a dwelling and comprises an audio-video source terminal, for example a DVD player, a television screen, a wireless surround controller (WSC) node to which the following are connected through a wireless network: first, second, third, fourth, fifth, sixth, seventh and eighth wireless active speakers here below called WAS nodes.

In this example, each WAS node has (or is associated with) an acoustic speaker which broadcasts one audio channel among the following channels FL (for Front Left), FR (for Front Right), C (Centre), SL (Surround Left), SR (Surround Right), RL (Rear Left), RR (Right Rear) and SW (Subwoofer).

A description is now provided of the working of a classic wireless 7.1 home cinema system.

The source terminal sends multi-channel digital audio content to the WSC node through a digital audio-video interface (or purely audio interface) which may be compliant for example with the SPDIF, IEEE-1394 or HDMI standards.

The WSC node receives the multi-channel digital audio content and then decodes and decompresses the audio data of the different audio channels (C, FL, FR, SL, SR, RL and RR).

Then, the WSC node inserts these audio data elements into radio packets. Finally, the WSC node transmits the radio packets to the WAS nodes through the 60 GHz radio channel.

After reception of the radio packets, each WAS node extracts the radio data corresponding to the audio channel assigned to it (C, FL, FR, SL, SR, RL or RR) from the radio packets. Each WAS node then makes a digital/analog conversion on the extracted audio data so as to obtain an audio signal. Finally, each WAS node amplifies the radio signal obtained and converts it into an acoustic signal so as to restore it through its acoustic speaker.

It may be recalled that in a wireless mesh network each node of the network behaves like a sender node during a predetermined frame of the super frame and like a receiver node during all the other frames of the super frame. When a node behaves like a sender node, its smart antenna is controlled to form a wide radiation pattern so it can reach a maximum number of nodes (WAS and WSC) of the network. By contrast, when a node behaves like a receiver node, its antenna is controlled to form a narrow, orientable radiation pattern so as to obtain high antenna gain and thus reach the distances required by the application.

Each receiver node orients its antenna at an angle adapted to the reception of audio data sent out by the current sender node. It must be noted that at each new frame (in other words at each change of a sender node), each receiver node must reorient its antenna at a new angle adapted to the reception of the audio data sent by the new sender node. To this end, each node of the wireless mesh network manages a table in which the angles of orientation of its reception antenna are stored. Each antenna orientation angle corresponds to a direct line of sight to communicate with another node of the network. This table may for example be initialized when the home cinema system is first put into service at the user's premises or again upon a request by this user through the home/machine interface of the system.

The mesh technique requires a rigorous spatial and temporal synchronization. Indeed, each node of the network must orient its antenna in the right direction and at the right time.

The mesh technique is well suited to wireless networks having a large number of nodes. However, for networks having a limited number of nodes, it is not optimal.

Indeed, for a 2.1 type home cinema system having only four nodes, the number of distinct radio paths is small. Thus, in certain configurations, when a shadowing comes into play on one of the radio paths, it may happen that certain nodes do not receive a sufficient number of copies of the same data to detect and correct the errors reliably.

Furthermore, it is noted that certain applications can dictate special constraints on the position of the nodes in the wireless mesh network. This is the case for example for the home cinema system described here above in which the position of the WAS nodes is dictated by the audio channel rendered by each of the WAS nodes. Thus, a node may be positioned in the network in such a way that it communicates with other nodes by using antenna orientation angle values that are close to each other. It may be recalled that each antenna orientation angle corresponds to a direct line of sight. Consequently, another major drawback of classic mesh technique lies in the fact that a same obstacle can disturb several direct lines of sight of a node (if this node uses antenna orientation angles that are close to each other), thus harming the overall quality of service of the network.

4. SUMMARY OF THE DISCLOSURE

An embodiment of the disclosure relates to a method for selecting an effective angle of reception of a directional antenna of a receiver node, said receiver node belonging to a wireless communications network comprising a plurality of emitter nodes. Such a method is implemented by the receiver node. According to the invention, a method for this kind comprises steps of:

determining at least two possible angles of reception associated with a first emitter node, each possible angle of reception corresponding to a communication path allowing said receiver node to communicate with said first emitter node; and for each of said at least two possible angles of reception, determining a difference between that angle and an angle of reception associated with a second emitter node different from said first emitter node, and selecting the effective angle of reception from among said at least two possible angles of reception associated with said first emitter node as a function of the determined differences.

Thus, an embodiment of the invention proposes the selection of an effective angle of reception to communicate with a given sender node as a function of an angular divergence. More specifically, the general principle of the invention consists in choosing the effective angle of reception as a function of the proximity between the values of the possible angles of reception to communicate with a given sender node and values of effective angles of reception enabling communication with other (second) sender nodes of the network. An embodiment of the invention can therefore be used to improve the coverage of the network since the receiver node selects values of effective angles of reception which are distant from one another. Thus, the technique of the invention can be used to prevent an obstacle situated in a given communications path from disturbing the other communications paths of the receiver node. These communications paths are angularly divergent from the communications path disturbed by the obstacle.

The effective angle of reception selected according to the invention may be the main angle of reception corresponding to the direct line of sight with the given sender node or a secondary angle of reception corresponding to a communications path obtained by reflection on an object.

Advantageously, said step of selecting the effective angle of reception comprises steps of:
  detecting, among said at least two possible angles of reception, that angle or those angles for which the divergence with at least one angle of reception associated with said second emitter node is greater than or equal to a predetermined angular threshold;
  if at least one possible angle of reception is detected, selecting the effective angle of reception from among said at least one possible angle of reception detected.

Thus, a pre-selection of the possible angles of reception is proposed. This pre-selection consists of a choice of the possible angles of reception as follows: if the angular difference (i.e. the divergence) between the possible angle of reception and each of the other effective angles of reception of the other sender nodes is greater than or equal to a predetermined angular threshold, then this possible angle of reception is chosen to be a candidate for the selection of the effective angle of reception. The invention therefore proposes to detect that or those angles of reception (called candidates), from among the possible angles of reception, which will enable an improvement in the spatial diversity in the network.

Advantageously, said step of selecting said effective angle of reception comprises a step of obtaining, among said at least two possible angles of reception, that angle for which the divergence with an angle of reception associated with said second emitter node is the greatest.

Thus, the selection of the effective angle of reception is function of the angular divergence with one or more angles of reception associated with the other sender node or nodes.

For example, when two possible angles of reception are close to each other, the receiver node obtains that angle which has the greatest angular divergence with the reception angle or angles associated with the other sender node or nodes.

In one particular embodiment, the obtaining step of the effective angle of reception consists of automatically choosing among said at least two possible angles of reception.

In one other particular embodiment, the obtaining step of the effective angle of reception consists of manually choosing by a user among said at least two possible angles of reception. For this aim, the user is given, for example, an information on the reception angle of which the angular difference compared to the reception angle for receiving the signal from the other sender node is the greatest (for example, displaying to the user "recommendation for setting a reception angle as *. OK for setting the reception angle as *?"), and the user selects manually via a man-machine interface, among the two possible angles of reception, the effective angle of reception.

Advantageously, the angle of reception associated with said at least one other sender node enabling the greatest divergence with the effective angle of reception is also obtained as an effective angle of reception relative to said second emitter node.

Thus, the receiver node uses the effective angles of reception which are at a maximum distance from one another. Thus, the spatial diversity in the network is maximized.

According to one advantageous aspect of the invention, said step of determining at least two possible angles of reception comprises steps of:
  obtaining a plurality of pairs of information elements each associating an angle of reception of said directional antenna and a level of signal received by said directional antenna, said pairs of information elements being obtained by performing angular sweep with said directional antenna;
  building a curve from said pairs of information elements;
  determining at least one local maximum value on said curve, each local maximum value being associated with a pair of information elements;
  identifying, from among the pair or pairs of information elements corresponding to the determined local maximum values, that pair or those pairs of information elements, which have a received signal level greater than or equal to a predetermined threshold level, the angle of reception associated with each identified information pair constituting a possible angle of reception.

Thus, only the local maximum values greater than or equal to the predetermined threshold level constitute possible angles of reception.

In another embodiment, the invention also pertains to a computer-readable storage medium, storing a computer program comprising a set of instructions executable by a computer in order to implement the method for selecting as described here above.

In another embodiment, the invention concerns a receiver node comprising means for selecting an effective angle of reception of a directional antenna of a receiver node, said receiver node belonging to a wireless communications network comprising a plurality of emitter nodes.

According to an embodiment of the invention, the receiver node comprises:
  means for determining at least two possible angles of reception associated with a first emitter node, each possible angle of reception corresponding to a communications path allowing said receiver node to communicate with said first emitter node, and
  means for determining, for each of said at least two possible angles of reception, a difference between that angle and an angle of reception associated with a second emitter node different from said first emitter node.

The means for selecting of the invention select the effective angle of reception from among said at least two possible angles of reception associated with said first emitter node as a function of the determined differences.

The advantages of the computer program product, storage means and receiver node are substantially the same as those of the selection method and are therefore not taken up again here.

Advantageously, said means for selecting comprise means for detecting, among said at least two possible angles of reception, the angle or angles for which the divergence with at least one angle of reception associated with said second emitter node is greater than or equal to a predetermined angular threshold. According to an embodiment of the invention:
  if at least one possible angle of reception is detected by said detection means, said means for selecting select the effective angle of reception from among said at least one possible angle of reception detected.

Advantageously, said means for selecting the effective angle of reception comprise means for obtaining, among said at least two possible angles of reception, that angle for which the divergence with an angle of reception associated with said second emitter node is the greatest.

Advantageously said means for obtaining obtain, as an effective angle of reception relative to said second emitter node, the angle of reception associated with said second emitter node making it possible to have the greatest possible divergence with the effective angle of reception.

Advantageously, said determining means comprise:
  means for obtaining a plurality of pairs of information elements each associating an angle of reception of said directional antenna and a level of signal received by said directional antenna,
  means for building a curve from said pairs of information elements;

means for determining at least one local maximum value on said curve, each local maximum value being associated with a pair of information elements;

means for identifying, from among the pairs of information elements corresponding to the determined local maximum values, that pair or those pairs of information elements which have a received signal level greater than or equal to a predetermined threshold level, the angle of reception associated with each identified information pair constituting a possible angle of reception.

5. BRIEF DESCRIPTION OF THE DRAWINGS

Other features and advantages shall appear from the following description, given by way of an indicative and non-restrictive example and from the appended drawings, of which:

FIG. 1 presents drawings of a WSC node and of WAS nodes according to a particular embodiment;

FIGS. 2a and 2b present an example of a sending radiation patterns of a smart emission antenna (FIG. 2a) and an example of a reception radiation pattern of a smart reception antenna (FIG. 2b) for a WAS node;

FIG. 6 is an example of a table of antenna angles of a node in receive mode obtained after the algorithm of FIG. 5 has been executed;

Figure 7:
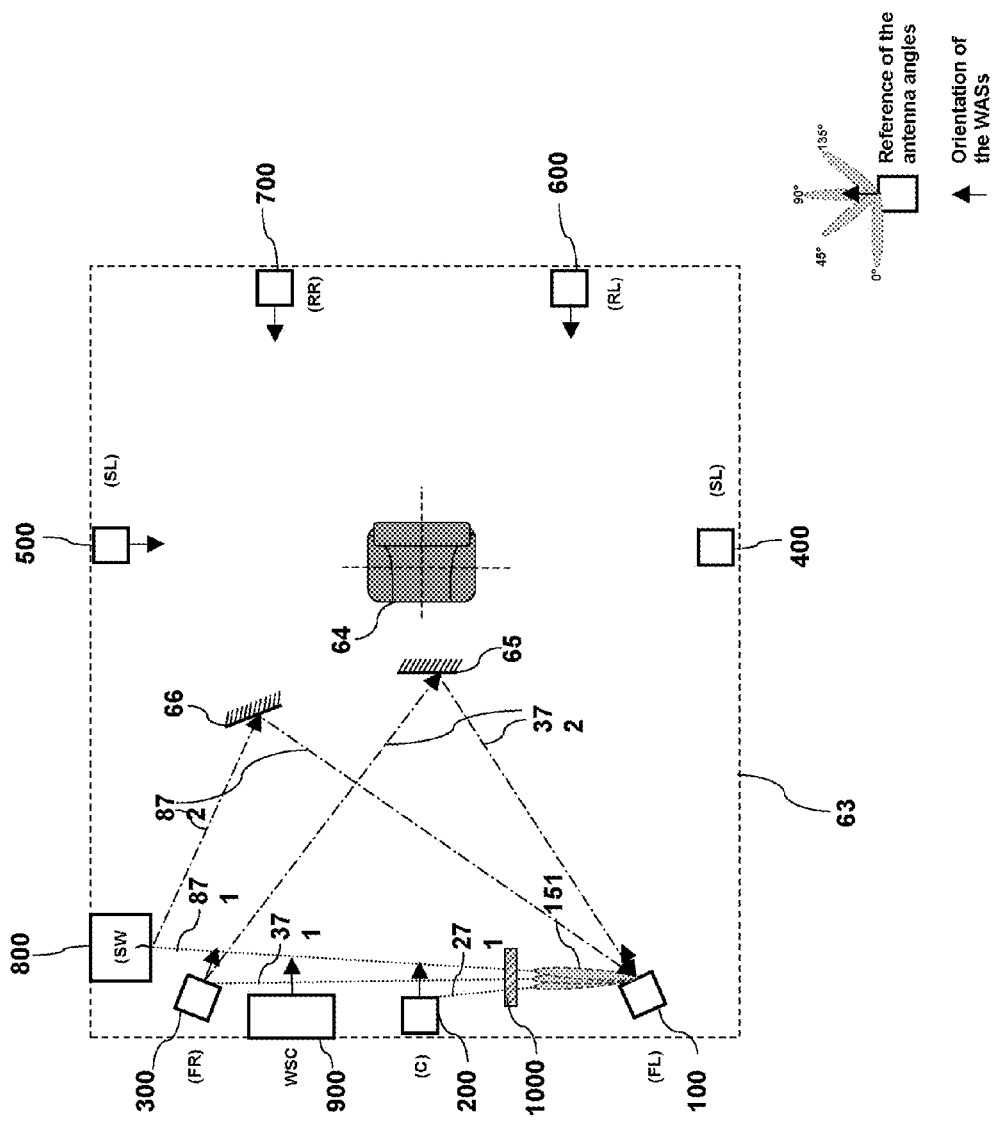
FIG. 7 shows examples of antenna orientations of the WAS node 100, appearing in FIG. 3, for three distinct sender nodes.
Figure 8:
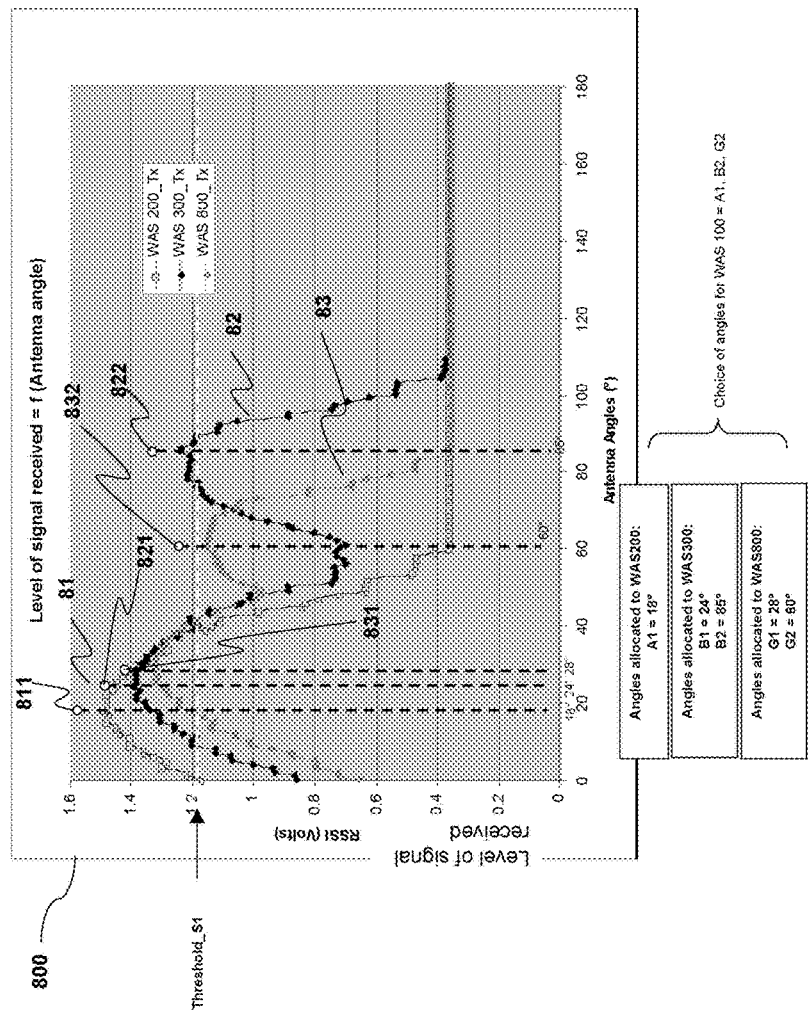
Figure 9:
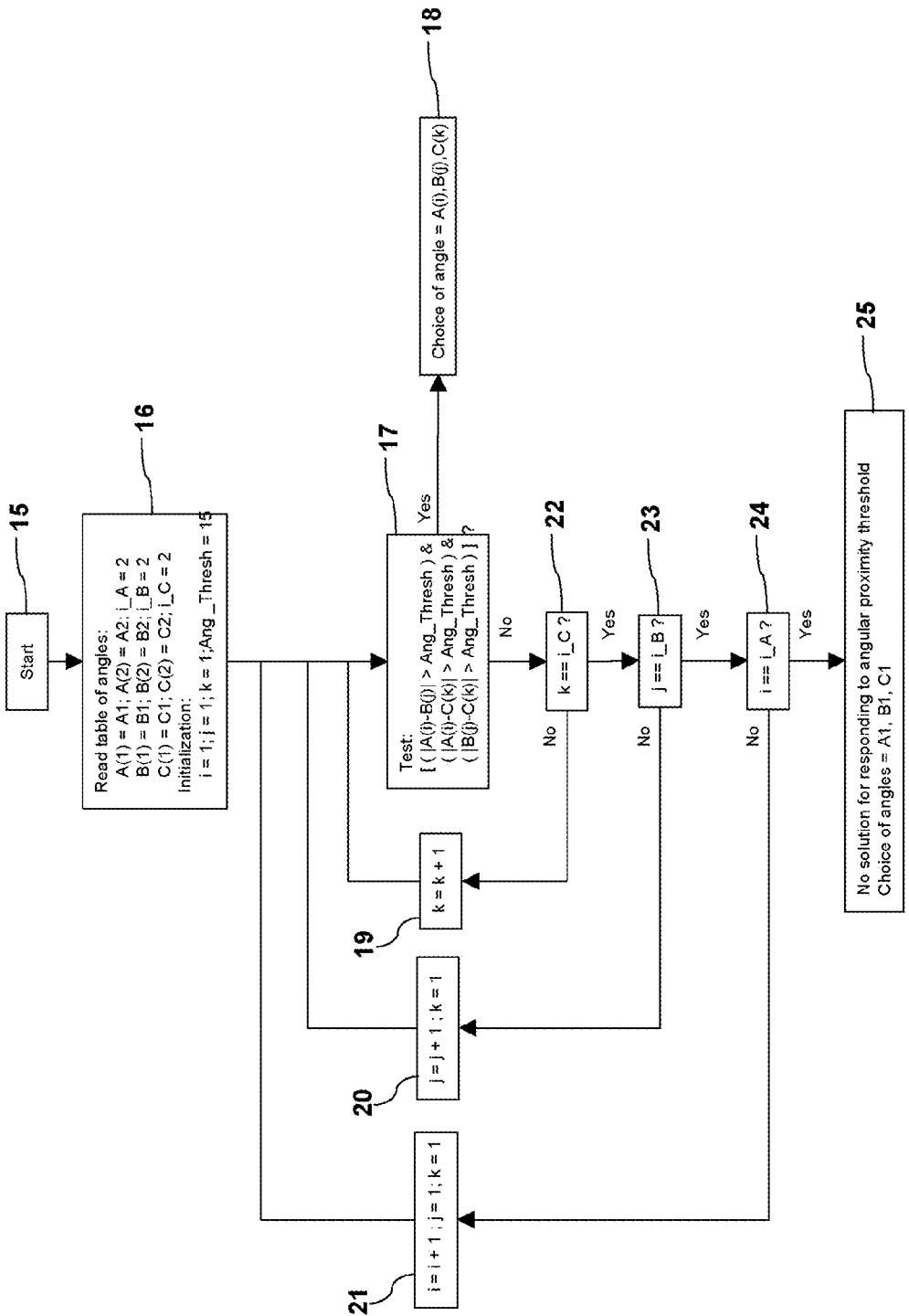

FIG. 8 presents examples of received signal level curves recorded in the RAM of the WAS node 100 appearing in FIG. 7, for the WAS nodes 200, 300 and 800 appearing in FIG. 7;

FIG. 9 presents the main steps of an algorithm for analyzing antenna orientation angle values recorded in a table of antenna angles of a receiver node according to a particular embodiment.

6. DETAILED DESCRIPTION OF ILLUSTRATIVE EMBODIMENTS

According to a particular application of the method for selecting according to a particular embodiment of the invention, the description here below is situated in the context of a 7.1 type wireless home cinema mesh network. Naturally, a particular embodiment of the invention can also be applied to any wireless home cinema network such as a 5.1 type home cinema network.

Naturally, in at least one other embodiment, the invention can also be implemented in any wireless mesh network implementing a TDM sequence and comprising a plurality of nodes working in the millimeter waveband.

6.1 Example of a 7.1 Type Wireless Home Cinema System

In the example shown in FIG. 3, the 7.1 wireless home cinema mesh network is laid out in a room 63 of a dwelling and has an audio video source terminal, for example a DVD player, a Blu-Ray player or again an HD-DVD player (not shown), a television screen (not shown), a wireless surround controller 900 here below designated as a WSC (Wireless Surround Controller) node to which the following are connected through a wireless meshed network: first 100, second 200, third 300, fourth 400, fifth 500, sixth 600, seventh 700 and eighth 800 wireless active speakers here below called WAS (Wireless Active Speaker) nodes.

In this example, each WAS node (100 to 800) has a speaker which broadcasts an audio channel, these audio channels being respectively the channels FL (for Front Left) for the WAS node 100, FR (Front Right) for the WAS node 300, C (Centre) for the WAS node 200, SL (Surround Left) for the WAS node 400, SR (surround right) for the WAS node 500, RL (rear left) for the WAS node 600, RR (Right Rear) for the WAS node 700 and SW (Subwoofer) for the WAS node 800.

The WAS nodes 100 to 800 are placed in the rectangular room 63 around the listening position of the listener 64 according to the recommendations of the Dolby laboratories. The position of each of the WAS nodes 100 to 800 depends on the audio channel associated with them.

Thus, the WAS node 200 comprising the loud speaker broadcasting the audio channel C is placed so as to be facing the listener 64. The WAS nodes 100 and 300 comprising the speakers respectively broadcasting the FL and FR audio channels are placed in front of the listener 64 on either side of the WAS node 200. The WAS nodes 400 and 500 comprising the speakers respectively broadcasting the LS and RS audio channels are placed respectively on the left and right hand side of the listener 64. The WAS nodes 600 and 700 comprising the speakers respectively broadcasting the RL and RR audio channels are placed behind the listener 64.

The position of the WAS node 800 is defined less strictly by the Dolby laboratories because the low frequencies reproduced by the WAS node 800 are not directional. Thus the WAS node 800 comprises the sub-woofer broadcasting the SW audio channel is placed for example in front of the listener 64 to the right of the WAS node 300.

In this example, the WSC node 900 is placed in front of the listening position of the speaker 64, between the WAS nodes 200 and 300.

6.2 Diagrams of the WSC Node and the WAS Nodes

Figure 3:
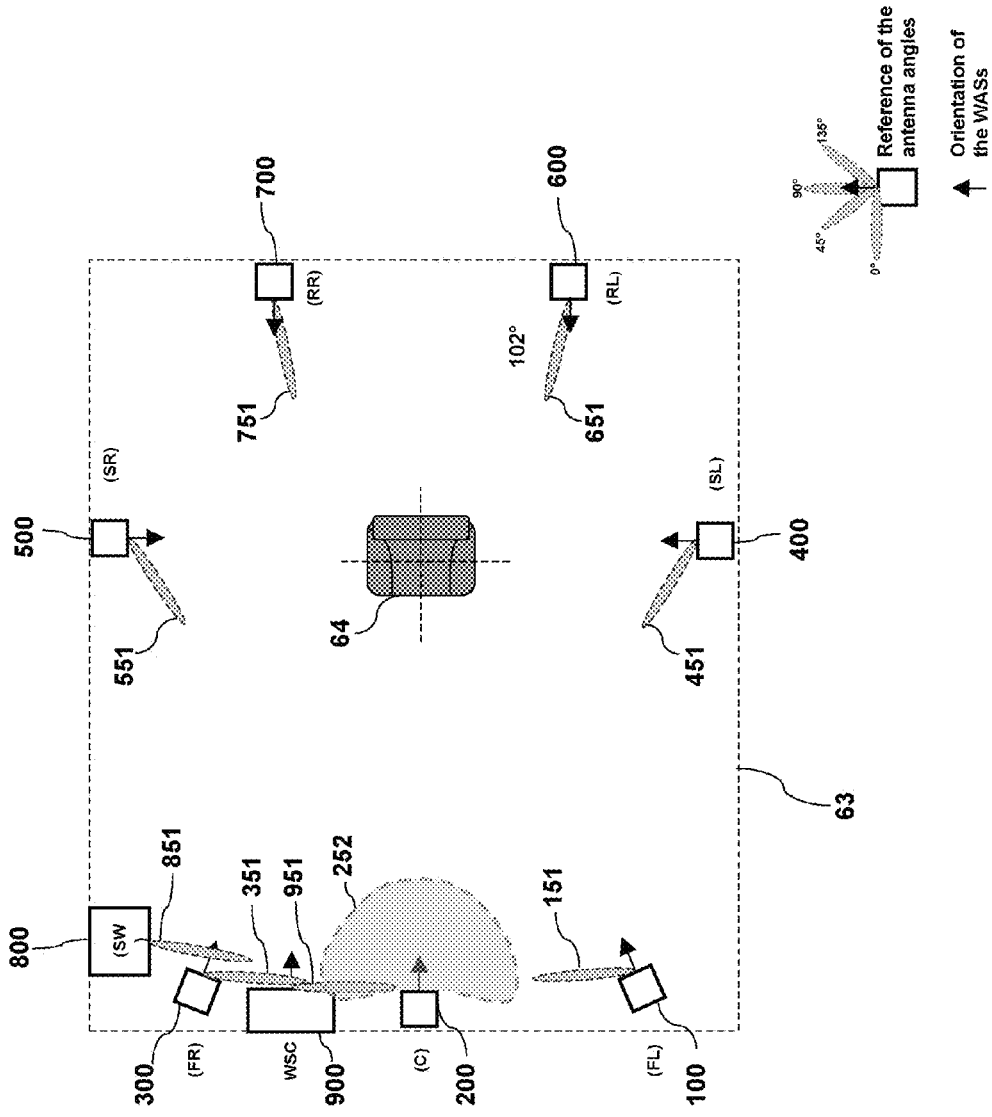
FIG. 3 shows an example of a wireless meshed network according to a particular embodiment.

The mesh network described here above with reference to FIG. 3 enables the WSC node 900 to transmit the audio data to be rendered along with the control data such as for example a volume control commands, acoustic equalization commands, etc. . . to each of the WAS nodes.

The mesh network enables each WAS node to re-transmit the audio data that it has received to the other WAS nodes and to re-transmit the control data to the WSC node 900. The mesh network implements the TDM transmission protocol. Furthermore, to perform these receive and send operations, each of the nodes of the network respectively has a smart emission antenna and a smart reception antenna.

Figure 1:
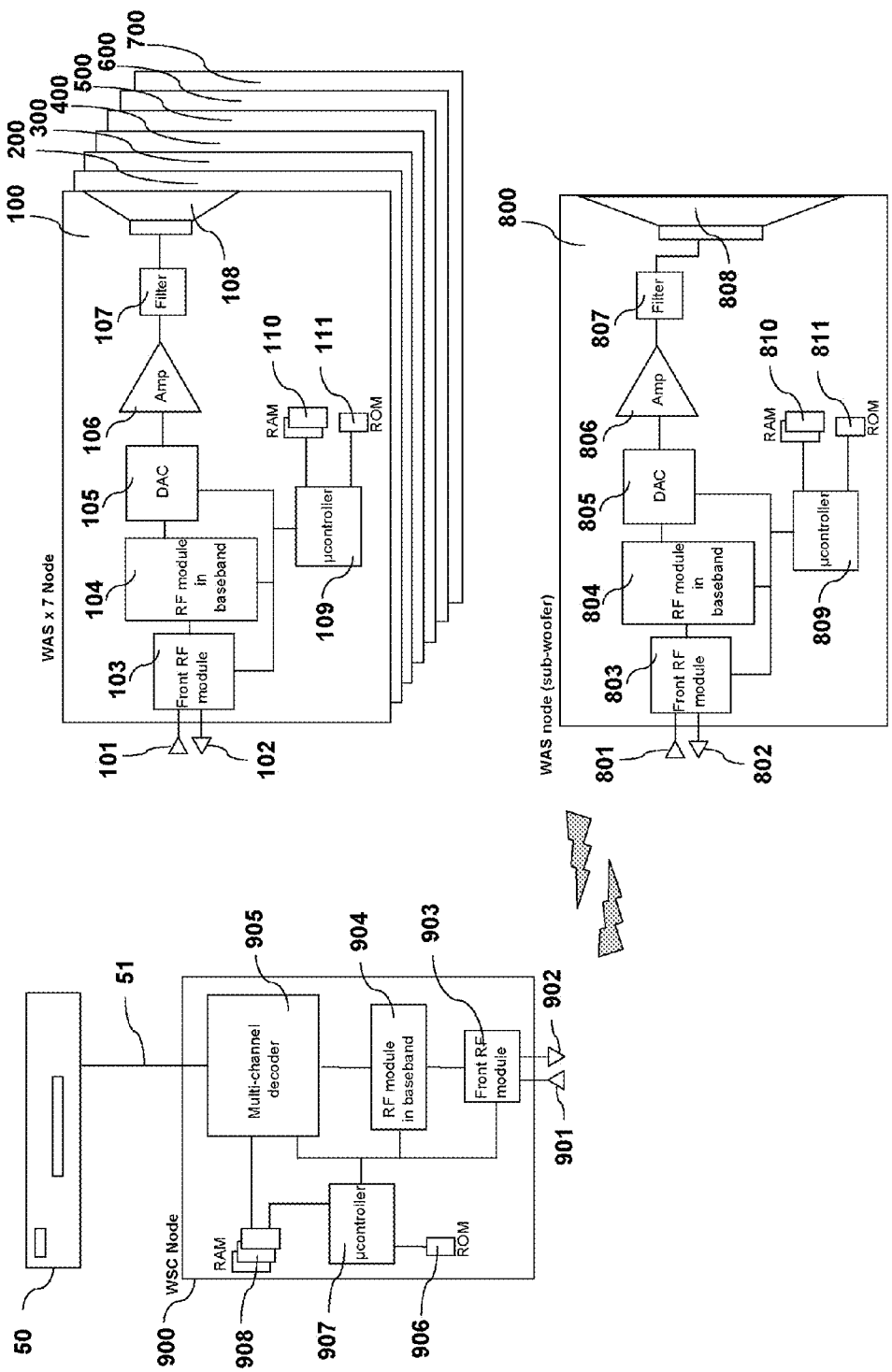

Referring to FIG. 1, we now present drawings of the WSC node 900 and the WAS nodes 100 to 800 according to a particular embodiment of the invention.

The source terminal 50 sends digital audio data from each audio channel to the WSC node 900 through a digital audio-video interface (or solely digital audio interface) 51 which may be compliant for example to one of the following standards: SPDIF, IEEE-1394 and HDMI.

In the WSC node 900, the digital audio data of each audio channel are received and processed by a multi-channel audio decoder 905. The multi-channel audio decoder 905 is capable of decoding and decompressing the digital audio data from the six channels of a pre-encoded system 5.1, for example in the Dolby Digital format or DTS (Digital Theatre Sound) or eight pre-encoded channels of a 7.1 system, pre-encoded for example in the "Dolby True HD (High Definition) format or DTS HD (Digital Theatre Sound High Definition) format.

The multi-channel audio decoder 905 decodes and decompresses the digital audio data of the different audio channels.

A RAM 908 can be used by the multi-channel audio decoder 905 to perform decoding and decompression tasks. The multi-channel audio decoder 905 can also implement a DSP (Digital Signal Processor) to add time lags to the audio channels or to add acoustic effects to the audio channels (for example in the context of an equalization).

Then, the multi-channel audio decoder 905 sends the audio data of each channel to a RF baseband module 904.

The RF baseband module 904 inserts the audio data from the different audio channels into packets. Each packet comprises:
- a header grouping together protocol information such as for example a packet number, indices indicating the position of the audio data of each audio channel;
- payload audio data grouping together the audio data intended for the different WAS nodes;
- an end-of-packet field grouping together the error correction information such as for example a piece of CRC (Cyclic Redundancy Check) information.

The packets are modulated and delivered to a RF front end module 903. The module 903 carries out a digital/analog conversion, an amplification and a transmission of the packets on an RF transmission channel such as for example a 60 GHz RF channel. The RF front end module 903 sends out packets through a smart antenna in sending mode 902. The WSC node 900 sends the packets during its speech time, i.e. during a frame of the super frame associated with it. For example, the WSC node 900 sends packets during the first frame (frame number 1) of the super frame.

The WSC node 900 can receive RF data packets coming from each WAS node through a smart antenna that is directional in reception 901. For example, after reception of the packets from the 60 GHz RF channel, the RF front end module 903 amplifies and carries out an analog/digital conversion on the received packets. The RF front end module 903 then transmits the packets to the RF baseband 904 which takes responsibility for extracting the payload data of each packet. These pieces of payload data are for example acknowledgements of receipt, data on antenna angles or again any piece of control information pertaining to a status.

The WSC node 900 has a microcontroller 907 to which several software programs implementing an embodiment of the invention are applied. The microcontroller 907 is adapted to communicating with and controlling the multi-channel audio decoder 905, the RF baseband module 904 and the RF font end module 903. The RAM 908 can be used by the microcontroller 907 to store the temporary data needed to accomplish these different tasks. An EEPROM (or FLASH type) memory 906 stores different pieces of information such as a hardware identifier (or serial number) of the WSC node 900, user data, the total number of WAS nodes and their respective identifier, the audio channel assigned to each WAS, an antenna angle table, a predefined TDM sequence etc.

The packets sent on the RF channel at 60 GHz by the WSC node 900 are received by all the WAS nodes 100 to 800.

As indicated here above, the random characteristics of the RF channel at 60 GHz are such that it may happen that certain WAS nodes cannot receive the data sent by the WSC node 900. To overcome these drawbacks inherent in the 60 GHz radio channel, the mesh technique as well as a TDM transmission protocol are implemented. These techniques add redundancy and multiply the reception paths of the audio data to make the network reliable.

The WAS node 100 is described here below in detail, while the WAS nodes 200 to 700 are not described because they are similar to the WAS node 100.

For example, by means for a directional smart antenna in receive mode 101, the WAS node 100 receives packets sent by the WSC node 900 and/or packets re-sent by the other WAS nodes. The different copies of the packets received by the reception antenna 101 are transmitted to the RF front end module 103 of the WAS node 100. The RF front end module 103 receives these packets coming from the RF channel at 60 GHz, and then carries out an amplification and an analog/digital conversion on these received packets.

Then, the RF front end module 103 transmits these packets to an RF baseband module 104. The RF baseband module 104 receives the different copies of a same data packet. These different copies are compared to locate the errors and then an appropriate error correction code is applied to correct these errors. Finally, the RF baseband module 104 carries out a filtering on the corrected data packet so that only the payload audio data elements situated on the index number corresponding to the audio channel assigned to the WAS node 100 are chosen to be delivered to the module 105.

Through this mechanism, only the corrected audio data elements corresponding to the audio channel assigned to the WAS node 100 are transmitted to the digital/analog converter 105 of the WAS node 100. The digital/analog converter 105 performs a digital/analog conversion on the audio data and delivers an analog audio signal to an amplifier 106. The frequency spectrum of this analog audio signal is generally from 100 Hz to 200 kHZ. After amplification by the amplifier 106, the amplified analog audio signal is delivered to the speaker 108 of the WAS node 100 through a filter 107. The speaker 108 converts the analog audio signal into an acoustic signal.

The WAS node 100 is also adapted to sending packets on the RF channel at 60 GHz through a smart send antenna 102. Thus, the WAS node 100 can send control data and/or status data to the WSC node and re-send the audio data packets that it has received to the other WAS nodes. The WAS node 100 sends the packets during its speech time. For example, the WAS node 100 sends the packets during the second frame (frame number 2) of the super frame.

The WAS node 100 has a microcontroller 109 to which one or more software programs implementing an embodiment of the invention are applied.

The microcontroller 109 is adapted to controlling and communicating with the digital/analog converter 105, the baseband RF module 104 and the RF front end module 103. A RAM 110 can be used by the microcontroller 109 to store the temporary data needed to carry out these different tasks. An EEPROM (or FLASH type) memory 111 stores different pieces of information such as a hardware identifier (or serial number) of the WAS node 100, user data, the total number of WAS nodes and their respective identifiers, the audio channel assigned to each WAS node, an antenna angle table, the predefined TDM sequence etc.

The WAS node 800 has a very different shape from that of the WAS nodes 100 to 700. However, the internal structure of the WAS node 800 is similar to that of the other WAS nodes 100 to 700 except that its audio reproduction stage for its part is different.

Indeed, the WAS node 800 is the sub-woofer of the home cinema system, its audio reproduction stage is dedicated to the reproduction of the low frequencies. The audio reproduction stage of the WAS node 800 has an amplifier 806, a filter 807 and a speaker 808 dedicated to the reproduction of low-frequency audio signals, generally ranging from 20 HZ to 100 HZ.

The WAS node 800 also has an EEPROM (or FLASH type) memory 811 in which a specific hardware identifier (or serial number) is stored.

Referring now to FIGS. 2a and 2b, we present the sending radiation pattern of the smart emission antenna 102 (FIG. 2a) and the reception radiation pattern of the smart reception antenna 101 (FIG. 2b) for the WAS node 100 according to a particular embodiment of the invention.

The particular embodiment described here reveals an architecture of the WAS and WSC nodes using two distinct smart antennas, one being used in sending mode and the other being used in receive mode. Naturally, other types of architectures can be envisaged. In particular, it is possible to envisage an architecture in which a same smart antenna can be used in the sender and receiver nodes.

The smart antennas in sending and receive mode of the WSC node 900 and WAS nodes 200 to 800 are identical to the smart emission antennas and reception antennas of the WAS node 100 and shall therefore not be described.

FIG. 2a is a top view of the WAS node 100 when it transmits packets on the network. This FIG. 2a illustrates the sending radiation pattern 152 coming from the smart emission antenna 102 of the WAS node 100. This sending radiation pattern 152 is oriented in the same direction as the acoustic signal reproduced by the speaker 108. The smart emission antenna 102 is used to transmit RF data on a 60 GHz radio channel.

The smart emission antenna 102 consists of a network of radiating elements controlled in phase and in amplitude by the RF front end module 103 so as to form an omni-directional emission antenna with a wide radiation pattern 152 to reach a maximum number of nodes in the network. In this example of an embodiment, the gain of the smart send antenna 102 is about 4 dBi.

FIG. 2b is a top view of the WAS node 100 when it receives packets on the network. The smart reception antenna 101 of the WAS node 100 is a directional antenna whose reception radiation pattern 151 is oriented according to an axis of radiation. This receive radiation pattern 151 is illustrated for three antenna angles formed by the radiation axis and by an angular antenna angle reference axis 141 proper to the WAS node 100 which is an axis included in the plane of the speaker membrane 108 of the WAS node 100 oriented leftwards to the speaker 108. It must be noted that each WAS node has its own antenna angle reference axis (defined in the same way as for the WAS node 100).

The smart reception antenna 101 is used to receive RF data coming from the 60 GHz radio channel. The smart reception antenna 101 uses the classic beam-forming technique in order to form a reception radiation pattern 151 which is narrow and orientable. This beam-forming technique can be used to increase the reception antenna gain 101 and thus attain the distance required by the home cinema application. In this example of an embodiment, the maximum gain of the smart reception antenna 101 is about 25 dBi.

The smart reception antenna 101 consists of a network of radiating elements which are controlled in phase and in amplitude by the RF front end module 103 so as to form a reception radiation pattern 151 which is narrow and orientable between a −15° antenna angle and a 195° angle in steps of 1°.

Each receiver node orients its antenna at an angle adapted to the reception of data coming from the current sender node. At each new frame of the TDM sequence, each receiver node must reorient its antenna at a new angle adapted to the new sender node.

Each node of the wireless meshed network has a table of antenna angles bringing together the orientation angles of its reception antenna required to communicate with the other nodes of the network. This table of angles is for example initialized when the home cinema system is first put into service at the user's premises or again when the user makes a request through the man/machine interface of the system.

Again, referring to FIG. 3, we present a phase of initialization of the 7.1 wireless home cinema system.

At this initialization phase, each node of the wireless mesh network initializes a table of antenna angles. More specifically, each node 100 to 900 searches for the values of orientation angles of its reception antenna 101 to 901 which enables it to communicate with the different sender nodes of the network. In other words, each node 100 to 900 searches for the different communications paths (direct and secondary paths) to receive data coming from the other nodes of the network.

This initialization phase brings into play each of the WAS nodes 100 to 800 and WSC 900 one after the other according to a predetermined sequence. Thus, the WAS nodes 100 to 800 and WSC node 900 will successfully send out an RF test signal, for example on the 60 GHz RF channel, according to a schedule defined by the predetermined sequence. The test signal comprises especially the identifier number of the current sender node (i.e. the node sending the test signal).

For example, the WAS node 200 is the first node to send the test signal. Thus, the WAS node 200 sends the test signal on the RF channel at 60 GHz for a duration that is lengthy enough so that each of the receiver nodes (WAS 100, 300, 400, 500, 600, 700, 800 and WAS 900) can perform a full antenna scan (for example for the reception antenna orientation angles ranging from 0° to 180°). The transmission radiation pattern 252 of the WAS node 200, when it sends the test signal, is illustrated in FIG. 3.

During this antenna scan, each WAS node 100, 300, 400, 500, 600, 700, 800 and WSC 900 in reception measures the received test signal level (RSSI) for each orientation angle of its reception antenna 101, 301, 401, 501, 601, 701, 801 and 901. At the end of the antenna scan, each WAS node 100, 300, 400, 500, 600, 700, 800 and WSC 900 in reception builds a curve (here below called a received signal level curve) representing the level of the test signal received as a function of the different orientation angles of its reception antenna for the WAS node 200 in send mode.

Each WAS node 100, 300, 400 etc 500, 600, 700, 800 and WSC 900 in receive mode temporarily records the received signal level curve built (received signal level (WAS 200)=f [antenna angles]) in its RAM 110, 310, 410, 510, 610, 710, 810 and 908 respectively.

Then, the other WAS nodes 100, 300, 400, 500, 600, 700, 800 and WSC node 900 in turn make transmission according to the predetermined sequence of the test signal on the 60 GHz RF channel so that the different receiver nodes can build and store the different received signal level curves in their RAM (received signal level (WASx00)=f [antenna angles]) for the different sender nodes.

At the end of the initialization phase, each of the receiver nodes builds and stores as many received signal level curves as there are sender nodes in the wireless meshed network.

Figure 4:
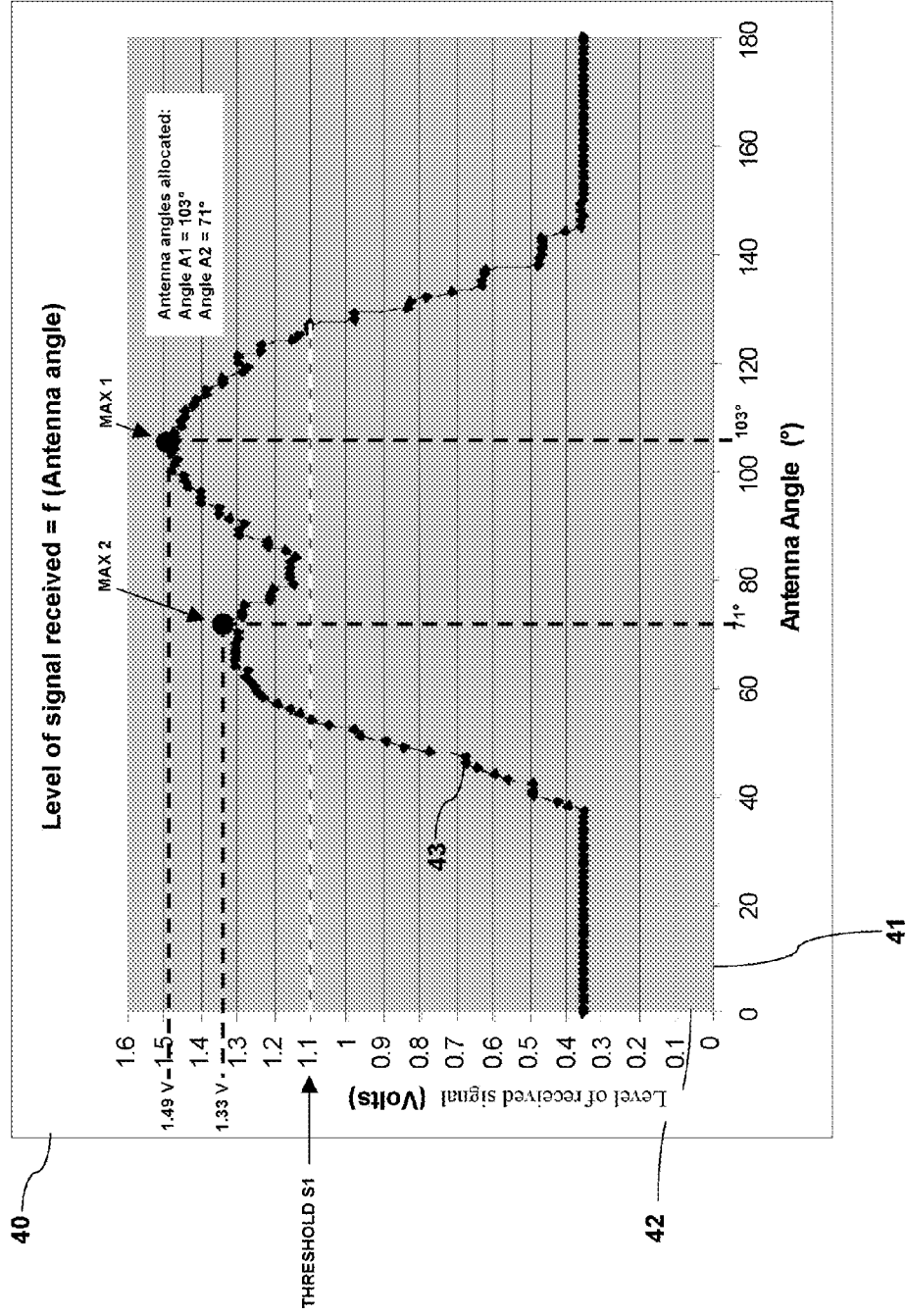
FIG. 4 is the example of a curve of a level of a received signal according to a particular embodiment.

Referring now to FIG. 4, we present an example of a received signal level curve recorded in the RAM of a receiver node.

The curve 43 reproduced on the graph 40 represents, for a receiver node (for example the WAS node 100), the level of the test signal received as a function of the different angles of orientation of its reception antenna when a given node is sending (for example the WAS node 200). In the graph 40, the x-axis 41 represents the antenna orientation angles of the receiver node. The unit used for the antenna orientation angles is the degree. The y-axis 42 represents the signal level received by the receiver node. The unit used for the signal level is the volt.

For antenna orientation angles ranging from 0° to 37°, the signal level received by the node in receive mode is situated in the region of 0.35V. This level corresponds to the noise level of the system. The receiver node therefore receives no radio test signal coming from the sender node for these antenna orientation angles.

For the antenna orientation angles ranging from 37° to 145°, the signal level received by the receiver node increases gradually to reach a first local maximum (denoted MAX2) at the antenna orientation angles of 71°. The signal level received with this first local maximum MAX2 is 1.33V. Once the antenna orientation angle of 71° has been passed, the received signal level diminishes and then rises again to reach a second local maximum (denoted MAX1) at the antenna orientation angle of 103°. The signal level received at this second local maximum MAX1 is 1.49V. Once the 103° antenna orientation angle has been passed and up to the antenna orientation angle of 145°, the received signal level received by the receiver node falls again.

For antenna orientation angles ranging from 145° to 180°, the signal level received by the receiver node is situated again in the region of 0.35V (i.e. at the noise level of the system).

The threshold S1 represented on the y-axis 42 of the graph 40 is situated at 1.1 V. The threshold S1 indicates the received signal level from which the receiver node is capable of communicating with a given node in sending mode.

The first and second local maximum values MAX1 and MAX2 are situated above the threshold S1. The points MAX1 and MAX2 therefore, for the receiver node, constitute possible communication points with the given sender node.

The first and second local maximum values MAX1 and MAX2 correspond to independent radio paths. The signal level received at the point MAXI is greater than the signal level received at the point MAX2. The point MAX1 will therefore correspond to the main radio path, i.e. the direct line of sight between the receiver node and the sender node. The point MAX2 for its part will correspond to a secondary radio path, i.e. a radio path obtained by reflection on an obstacle situated in the neighborhood of the receiver and sender nodes.

As described in detail here below, the method according to a particular embodiment of the invention is used to analyze each curve of a received signal level stored in the RAM of a given receiver node so as to detect and record the different antenna orientation angles at reception (corresponding to the different local maximum values of each curve greater than the above-mentioned threshold S1) in the table of antenna angles of the receiver node. The different antenna orientation angles in reception recorded in the table of angles are antenna orientation angles possible for the communication with the sender nodes.

Figure 5:
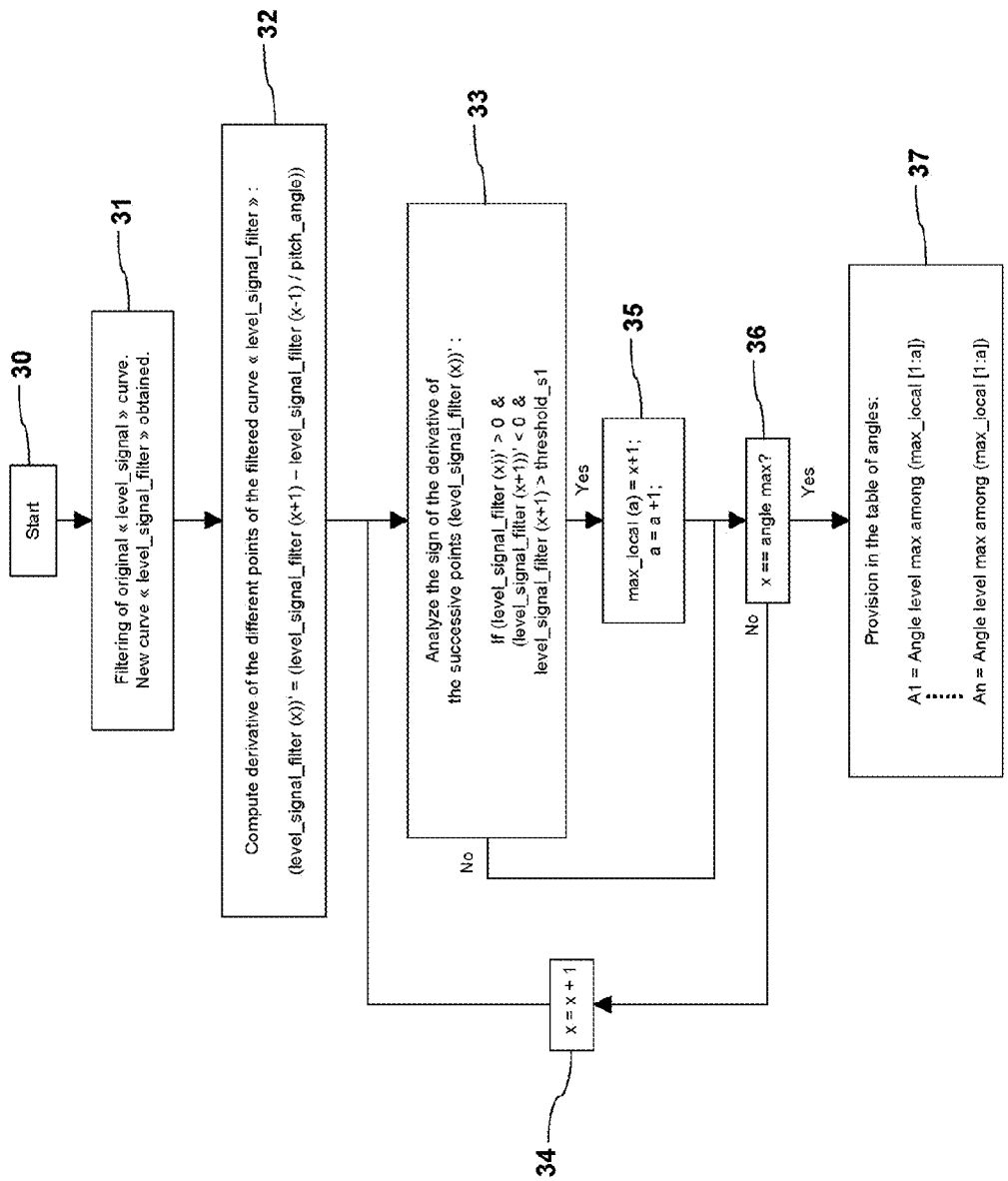
FIG. 5 shows the main steps of the algorithm implemented in the context of the phase of analysis of the signal level curves according to a particular embodiment.

Referring now to FIG. 5, we present the main steps of the algorithm implemented by a receiver node (WAS 100, 200, 300, 400, 500, 600, 700, 800 or WSC 900) in the context of the phase of analysis of the received signal level curves stored in the RAM (110, 210, 310, 410, 510, 610, 710, 810 or 908) of the receiver node considered.

This algorithm, given by way of an example, is stored in the ROM and executed by the microcontroller of the receiver node considered.

The aim of this phase of analysis is that the microcontroller of the node considered should set up a table of antenna angles comprising the values of the angle formed by its reception antenna relative to a reference system (for example the reference plane of the direction of sending of the sound waves coming from the speaker associated with the node considered, i.e. the front face of the speakers) when this antenna is orientated so as to receive the data sent out by each of the other nodes of the network (following the predetermined TDM sequence). This table of antenna angles is for example stored by the microcontroller in the ROM of the node considered.

The steps of the algorithm described here below are implemented for each of the signal level curves stored in the RAM of the receiver node considered.

In a step 30, the analysis phase is begun. When the system is started, the node considered has not initialized the table of antenna angles in its ROM. Variables "x" and "a" are initialized with the value "0".

At a step 31, a filtering is done on the original signal level curve (here below denoted as "level_signal") stored in the RAM of the node considered. At the end of this step 31, a filtered curve is obtained, here below denoted as a "level_signal_filter". In a particular embodiment of the invention, the filtering implemented at the step 31 may consist of applying a sliding average on, for example, ten points of the original "level_signal" curve.

In a step 32, the derivative of the different points of the filtered curve "level_signal_filter" is computed. The derivatives computed for the different points are noted here below "(level_signal_filter (x))". The derivative of the different points is obtained from the following formula:

$$(\text{level\_signal\_filter }(x))' = ((\text{level\_signal\_filter}(x+1) - \text{level\_signal\_filter }(x-1))/\text{step\_angle}).$$

This formula is well known to those skilled in the art.

The purpose of the step 33, 34, 35 and 36 described here below is that the microcontroller of the node considered should identify and temporarily store the local maximum value or values of the filtered curve "level_signal_filter" in the RAM of the node considered. As shall be seen here below, the identification of the local maximum values is done in detecting the change in sign of the derivative for the successive points.

The steps 33, 35, 34 and 36 are repeated so long as the variable "x" has not reached the maximum antenna angle value.

In a step 33, the sign of the derivative of the successive points "x" and "x+1" is analyzed. Furthermore, the signal level received for the angle value "x+1" is compared with the above-mentioned threshold S1. It may be recalled that the threshold S1 represents the signal level received from which the receiver node is capable of communicating with a given node in sender node. The level of the threshold 51 is stored in the variable "threshold_S1".

The analysis done at the step 33 can be formulated as follows:
  if the sign of the derivative for the point corresponding to the antenna orientation angle "x" is positive; and
  if the sign of the derivative for the point corresponding to the antenna orientation angle "x+1" is negative; and
  if the signal level received for the antenna angle value "x+1" is greater than the threshold "threshold_s1";
  then the presence of a local maximum value is detected at the point corresponding to the antenna orientation angle "x+1", and the operation passes to a step 35;
  otherwise, the operation passes to a step 36.

At the step 35, the antenna orientation angle corresponding to the local maximum value detected at the step 33 is stored at the line "a" of a table here below denoted as "max_local". The variable "a" is then incremented by one unit so that the next local maximum value is recorded at the next row of the "max local" table.

At the step 36, a check is made to see if the variable "x" has reached the maximum antenna orientation angle value. If the check is positive, the operation passes to a step 37. If not, the operation passes to a step 34.

At the step 34, the variable "x" is incremented by one unit. Then, the operation returns to the step 33.

At the step 37, the table of antenna angles of the node considered is built from different angles of antenna orientation corresponding to the different local maximum values detected and stored in "max_local" table (step 35). More specifically, the different antenna orientation angles are recorded (of the "max_local" table) are recorded in the table of antenna angles of the node considered, in descending order of signal level so that the first angle of the table of antenna angles is the angle corresponding to the local maximum value for which the signal level is the maximum, and so that the last angle of the table of antenna angles is the angle corresponding to the local maximum value for which the signal level is the minimum.

Referring now to FIG. 6, we present an example of a table of antenna angles of a receiver node obtained after execution of the algorithm described here above with reference to FIG. 5.

For example, the table 10 is the table of antenna angles of the WAS node 100. The possible antenna orientation angles of the WAS node 100 in reception for communicating with a given sender node are shown in the column corresponding to the sender node.

For example, to communicate with the WAS node 200, the WAS node 100 has angles A1, A2 and A3. To communicate with the WSC node 900, the WAS node 100 has angles H1, H2, H3.

The angles A1, B1, C1, D1, E1, F1, G1, H1 situated on the row 11 correspond to the main antenna angles. In other words, these angles respectively correspond to the direct line of sight between the WAS nodes 100, 300, 400, 500, 600, 700, 800 and WSC node 900 in emission and the reception WAS node 100.

The angles A2, B2, C2, D2, E2, F2, G2, H2 and A3, B3, C3, D3, E3, F3, G3, H3, respectively situated on the rows 12 and 13, correspond to secondary antenna angles. In other words, these angles respectively correspond to a secondary radio path obtained by reflection on an obstacle situated in the neighborhood of the WAS nodes 100, 300, 400, 500, 600, 700, 800 and WSC node 900 and the reception WAS node 100.

In the exemplary embodiment described here above, the reception node (WAS node 100) has three antenna orientation angles per sender node. Those skilled in the art will have no difficulty in extending this teaching to the case where the reception node has a different number of antenna orientation angles available for each sender node.

Referring now to FIG. 7, we present the antenna orientations of the reception WAS node 100 for three distinct sender nodes.

The wireless home cinema system shown in FIG. 7 is identical to the one described with reference to FIG. 3.

In the example illustrated in FIG. 7, the WAS node 100 is in reception.

The radiation pattern 151 of the reception antenna 101 of the WAS node 100 is shown for three distinct antenna orientation angles corresponding respectively to the direct lines of sight to communicate with the three sender WAS nodes 200, 300 and 800.

The direct lines of sight between the reception WAS node 100 and the sender WAS nodes 200, 300 and 800 are indicated respectively by dots and dashes 271, 371 and 871.

The three antenna orientation angles shown in FIG. 7 (corresponding to the direct lines of sight 271, 371 and 871) for the WAS node 100 in reception are the antenna orientation angles obtained with the classic mesh technique (described here above with reference to the prior art). According to this classic technique, the choice of the antenna orientation angle to communicate with a given sender node is done solely as a function of the level of signal received. In other words, the classic mesh technique is used to choose the antenna orientation angle enabling the reception node considered to communicate with the sender node considered with the best possible signal level.

This classic mesh technique has a major drawback.

For example, for the wireless home cinema system shown in FIG. 7, it has been observed that the three antenna orientation angles of the WAS node 100 in reception are close to each other.

Consequently, an obstacle 1000 situated between the WAS node 100 and the WAS node 200 may disturb the three direct lines of sight 271, 371 and 871. Thus, the WAS node 100 in reception can find itself unable to receive the data copies sent out by the WAS nodes 200, 300 and 800, in sending mode. In the example shown, the obstacle 1000 may also prevent the WAS node 100 from receiving data copies sent by the WSC node 900.

A single obstacle can therefore disturb the reception of the data copies sent by several sender nodes, and thus by itself alone imperil the working of the wireless home cinema system.

An embodiment of the invention makes it possible to resolve the problem of shadowing of several communications paths by a same obstacle. Indeed, an embodiment of the invention proposes a wholly novel and inventive approach according to which the choice of the antenna orientation angle to communicate with a given sender node is done as a function of the signal level received and as a function of a predetermined criterion of angular proximity. According to one particular embodiment of the invention, this criterion of angular proximity may be formulated as follows: the angular difference between the antenna orientation angle chosen to communicate with the given sender node and the other antenna orientation angles of the other sender nodes should be greater than or equal to a predetermined angular proximity threshold.

An embodiment of the invention therefore favors spatial diversity rather than the quality of the signal received. Thus, contrary to the classic mesh technique, where there is a risk a same obstacle will disturb a large number of communications paths, the present invention according to a particular embodiment reduces the number of communications paths disturbed by a same obstacle.

Referring now to FIG. 8, we present examples of level curves of a received signal recorded in the RAM of the WAS node 100 in reception for the sender WAS nodes 200, 300 and 800.

In the graph 800, the x-axis 801 represents the antenna orientation angles of the reception WAS node 100. The unit used for the antenna orientation angles is the degree.

The y-axis 802 represents the level signal received by the WAS node 100 in reception. The unit used for the received signal level is the volt.

The curve 81 reproduced in the graph 800 represents, for the reception WAS node 100, the signal level received as a function of the different orientation angles of its reception antenna when the WAS node 200 is sending.

The curve 82 reproduced in the graph 800 represents, for the reception WAS node 100, the level of signal received as a function of the different angles of orientation of its reception antenna when the WAS node 300 is in sending mode.

The curve 83 reproduced in the graph 800 represents, for the WAS node 100 in reception, the level of signal received as a function of the different angles of orientation of its antenna in reception when the WAS node 800 is sending.

The WAS node 100 executes the algorithm described with reference to FIG. 5 so as to detect, for each of the curves 81, 82 and 83, the different antenna angles corresponding to the different maximum points of the curve above a predetermined threshold (threshold S1).

Through the algorithm of FIG. 5, the WAS node 100 detects a maximum point 811 on the curve 81. For example, the maximum point 811 corresponds to the 18° antenna angle orientation of the WAS node 100. The 18° antenna angle is then recorded in the table of antenna angles of the WAS node 100. For example, the 18° antenna angle is assigned to the main antenna angle A1 of the table of antenna angles described here above with reference to FIG. 6. The 18° main antenna angle A1 corresponds to the direct line of sight 271 shown in FIG. 7.

On the curve 81, no other maximum point is found. In other words, there is no secondary communication path exists to communicate with the WAS node 200 in sending mode.

Through the algorithm of FIG. 5, the WAS node 100 detects two maximum points 821 and 822 on the curve 82. For example, the maximum point 821 whose signal level is the highest corresponds to the 24° antenna orientation angle of the WAS node 100. The 24° antenna angle is then recorded in the table of antenna angles of the WAS node 100. For example, the 24° antenna angle is assigned to the main antenna angle B1 of the table of antenna angles described here above with reference to FIG. 6. The 24° main antenna angle B1 corresponds to the direct line of sight 371 shown in FIG. 7.

For example, the maximum point 822, whose signal level is lower than that of the maximum point 821, corresponds to the 85° antenna orientation angle of the WAS node 100. The 85° antenna angle is then recorded in the table of antenna angles of the WAS node 100. For example, the 85° antenna angle is assigned to the secondary antenna angle B2 of the tables of antenna angles described here above with reference to FIG. 6. The 85° secondary antenna angle B2 corresponds to the secondary communications path 372 shown in FIG. 7. This secondary communications path 372 is obtained by reflection on an obstacle such as, for example, a piece of furniture or any object having a surface that is reflecting for the 60 GHz radio waves.

Through the algorithm of FIG. 5, the WAS node 100 detects two maximum points 831 and 832 of the curve 83. For example, the maximum point 831 whose signal level is the highest corresponds to the 28° antenna orientation angle of the WAS node 100. The 28° antenna angle is then recorded in the table of antenna angles of the WAS node 100. For example, the 28° antenna angle is assigned to the main antenna angle G1 of the table of antenna angles described here above with reference to FIG. 6. The 28° main antenna angle G1 corresponds to the direct line of sight 871 shown in FIG. 7.

For example, the maximum point 832, whose signal level is lower than that of the maximum point 831, corresponds to the 60° antenna orientation angle of the WAS node 100. The 60° antenna angle is then recorded in the table of antenna angles of the WAS node 100. For example, the 60° antenna angle is assigned to the secondary antenna angle G2 of the tables of antenna angles described here above with reference to FIG. 6. The 60° secondary antenna angle B2 corresponds to the secondary communications path 872 shown in FIG. 7. This secondary communications path 872 is obtained by reflection on an obstacle such as, for example, a piece of furniture or any object having a surface that is reflecting for the 60 GHz radio waves.

As shall been seen in greater detail here below, the algorithm for analyzing the antenna orientation angle values recorded in the table of antenna angles of the WAS node 100 in reception is used to compute the angular differences between the different values of antenna angles and compare them, for example with a predetermined angular proximity threshold.

For example, for a set of angles (also called a combination of angles) comprising the 18° main antenna angle A1, 24° main antenna angle B1 and 28° main antenna angle G1, the angular differences A1–B1, A1–G1 and B1–G1 are computed and compared with a predetermined angular proximity threshold.

For example, the angular proximity threshold is set at 15°.

The analysis algorithm according to a particular embodiment compliant with the invention is used to detect the fact that the differences A1–B1, A1–G1 and B1–G1 are below the 15° angular proximity threshold. The angles A1, B1 and G1 are therefore close to each other.

The algorithm of analysis according to the particular embodiment compliant with the invention carries out a check in the table of antenna angles of the WAS node 100 in reception mode to see if there are secondary angles to communicate with the WAS nodes 200, 300 and 800. In the example shown in FIG. 7, there is an 85° secondary antenna angle B2 to communicate with the WAS node 300 and a 60° secondary antenna angle G2 to communicate with the WAS node 800.

The analysis algorithm according to the particular embodiment compliant with the invention analyzes the possible combinations of antenna angles and computes all the angular differences of the different combinations of angles.

For example, after execution of the analysis algorithm according to the particular embodiment compliant with the invention, the reception WAS node 100 selects the combination of antenna angles A1, B2, G2. In the example illustrated in FIG. 7, by using this combination of antenna angles A1, B2, G2, an obstacle 1000 situated between the WAS node 100 and WAS node 200 disturbs only the communication path 271. The reception WAS node 100 continues to receive the copies of data elements sent by the WAS nodes 300 and 800 through the secondary communication paths 372 and 872 respectively.

In one particular embodiment, to further improve the coverage of the wireless mesh network, the WAS node 100 sends a message to the WAS nodes 300 and 800 to inform them that they must use, if available, secondary angles of reception when the WAS node 100 is in sending mode.

For example, as described here above, the analysis algorithm of an embodiment of the invention enables the WAS node 100 in reception to detect the fact that one and the same shadowing phenomena could affect reception of the copies of data elements sent by the WAS nodes 200, 300 and 800. For example, the analysis algorithm according to an embodiment of the invention enables the WAS node 100 in reception to choose secondary antenna reception angles to communicate with the WAS nodes 300 and 800.

To prevent this same masking from disturbing the receptions of the WAS nodes 300 and 800, the WAS node 100 informs the WAS nodes 300 and 800 that they must if possible use secondary angles of reception to receive the copies of data elements that will be sent by the WAS node 100 when this node is in sending mode.

For example, the WAS node 100 sends the message intended for the WAS nodes 300 and 800 when its speech time has come in the wireless mesh network.

Referring to FIG. 9, we present the main steps of an algorithm for analyzing antenna orientation angle values recorded in a table of antenna angles in reception node according to a particular embodiment compliant with the invention.

For the sake of simplifying the description, the description shall be limited to the particular case in which the algorithm presented in FIG. 9 is implemented for a table of antenna angles of a reception node comprising three sender nodes and comprising two values of antenna orientation angles per sender node.

Those skilled in the art will extend this teaching without difficulty to a table of antenna angles comprising a smaller or greater number of sender nodes and comprising a smaller or greater number of values of antenna orientation angles per sender node.

In a step 15, the analysis algorithm according to the particular embodiment of the invention starts. This algorithm given by way of an example is stored in the ROM and executed by the microcontroller of the node in reception considered.

A step 16 is used to read the values of the antenna angles A1, A2, B1, B2, C1 and C2 recorded in the table of antenna angles of the reception node considered and these values are recorded respectively in the tables A, B and C. For example, the value of angle Al angle is stored at the index 1 of the table A, denoted A(1); the table of the angle A2 is stored in the index 2 of the table A, denoted A(2); the value of the angle B1 is stored at the index 1 of the table B, denoted B(1) . . . etc.

For example, the variables i_A, i_B and i_C are initialized at the value 2. The variables i_A, i_B and i_C respectively correspond to the number of antenna angles provided for (allocated to) the sender nodes A, B and C.

For example, the loop variables i, j and k are set at the value 1. As shall be seen here below, the loop variables i, j and k are used to review the different antenna angles respectively stored in the tables A, B and C.

For example, the variable Ang_Thresh is set at the value of 15°. The variable Ang_Thresh corresponds to the angular proximity threshold.

A step 17 is used to compute all the angular differences for all the combinations of antenna angles provided for (allocated to) the three sender nodes considered.

This same step 17 is used to make a check, for the different values of the variables i, j and k, to see whether the absolute values of the three angular differences A(i)–B(j), A(i)–C(k), B(j)–C(k) computed are all greater than or equal to the angular proximity threshold Ang_Thresh.

Should the check be positive, it means that there is a combination of antenna angles defined by the current values of the variables i, j and k meeting the criterion of angular proximity as understood in the particular embodiment of the invention. In this case, the operation passes to a step 18. If not, it passes to a step 22.

The step 18 is used to send the reception node considered the combination of angles A(i), B(j), C(k) to be used (i.e. the combination of antenna angles determined at the step 17). The values of the antenna angles chosen correspond to the values of the angles situated at the index i, j and k of the tables A, B and C. The values of i, j and k are current values of each of the variables.

In the particular embodiment shown, the step 17 is looped back so long as the absolute values of the three angular differences A(i)–B(j), A(i)–C(k), B(j)–C(k) are all below the angular proximity threshold Ang_Thresh. For example, the algorithm implements three distinct loops to test all the possible combinations of antenna angles.

For example, the first loop is iterated so long as the loop variable k is not equal to the variable i_C. At the step 822, a check is made to see whether the variable k is equal to the variable i_C. In the event of a positive check, the invention according to a particular embodiment passes to a step 23. If not, it passes to a step 19.

At the step 19, the variable of the loop k is incremented by one unit. Then, in the particular embodiment the invention returns to the step 17.

For example, the second loop is iterated so long as the loop variable j is not equal to the variable i_B. At the step 23, a check is made to see if the variable j is equal to the variable i_B. In the event of a positive check, the operation passes to a step 24. If not, it passes to a step 20.

At the step 20, the loop variable j is incremented by one unit and the loop variable k is reset at 1. Then the operation returns to the step 17.

For example, the third loop is iterated so long as the loop variable i is not equal to the variable i_A. At the step 24, a check is made to see if the variable i is equal to the variable i_A. In the event of a positive check, the operation passes to a step 25. If not, it passes to a step 21.

At the step 21, the loop variable i is incremented by one unit and the loop variables j and k are reset at 1. Then, the operation returns to the step 17.

At the step 25, it is detected that there is no combination of antenna angles complying with the angular proximity criterion as understood in the particular embodiment of the invention. In this case, it is possible for example to inform the reception node that it must use the combination of antenna angles A1, B1 and C1 corresponding to the main antenna angles for the communication with the three sender nodes considered.

The algorithm presented with reference to FIG. 9 is a first non-restrictive embodiment of the present invention. According to this algorithm, the choice of the antenna angles is based on a predetermined angular proximity threshold. In this first embodiment, the first combination of antenna angles identified as responding to the criterion of angular proximity is selected.

In a second embodiment, an algorithm based on the selection of the antenna angles having the maximum angular divergence can be used. In this embodiment, the step 17 would consist of recording the sum of the absolute values of angular divergence for all the combinations of antenna angles provided (allocated). Ultimately, the combination of antenna angles corresponding to the sum of the absolute values giving the maximum result would be chosen.

For example, let $S_{i,j,k}$ be the sum of divergence values for a given combination (i,j,k). We then get:

$$S_{i=1,j=1,k=1} = (|A1-B1|+|A1-C1|+|C1-B1|)$$

$$S_{i=1,j=1,k=2} = (|A1-B1|+|A1-C2|+|C2-B1|)$$

$$S_{i=2,j=2,k=2} = (|A2-B2|+|A2-C2|+|C2-B2|)$$

The combination of antenna angles (i,j,k) chosen will be the one having the corresponding $S_{i,j,k}$ with the greatest value.

In a third embodiment, an algorithm based both on a predetermined angular proximity threshold and on the selection of the antenna angles having the maximum angular divergence can be chosen. In this embodiment, the step 17 would in a first stage consist in identifying all the combinations of antenna angles for which the absolute values of the angular divergences are greater than the angular proximity threshold. Then, in a second stage, the step 17 would consist in recording the sum of the absolute values of the angular divergences of each of the combinations of antenna angles identified. Ultimately, the combination of antenna angles corresponding to the sum of the absolute values giving the maximum results would be chosen.

In resuming the above example, this amounts to choosing, in this third embodiment, the combination of antenna angles (i,j,k) having the $S_{i,j,k}$ values corresponding to the greatest of the combinations of angles for which the divergences and |Ai−Bj|, |Ai−Ck| and |Ck−Bj| are greater than the predetermined angular proximity threshold.

The disclosure provides a technique giving one or more effective antenna reception angles and enabling a receiver node to communicate with one or more sender nodes, the effective angles of reception being used to improve the reliability of the transmission of data in the network (in the event of shadowing).

The disclosure proposes, in at least one embodiment, a technique of this kind that can be used to improve spatial diversity in the network.

The disclosure proposes, in at least one embodiment, a technique of this kind that can be used to ensure that a same shadowing phenomenon disturbs only a limited number of communications paths.

The disclosure also proposes, in at least one embodiment, a technique of this kind that can be used to improve the quality of service of the application without necessitating the implementation of a bit-error-rate measuring mechanism that is complex and costly.

The disclosure proposes, in at least one embodiment, a technique of this kind that is especially well suited to the case of wireless mesh networks comprising a limited number of nodes and having constraints on the positions of the nodes.

The disclosure further proposes, in at least one embodiment, a technique of this kind that is simple to implement and costs little.

What is claimed is:

1. A method for selecting an effective angle of reception of a directional antenna of a receiver node, said receiver node belonging to a wireless communications network comprising a plurality of emitter nodes, the method being implemented by the receiver node, wherein said method comprises steps of:
   determining at least two possible angles of reception associated with a first emitter node, each possible angle of reception corresponding to a communication path allowing said receiver node to communicate with said first emitter node; and
   for each of said at least two possible angles of reception, determining an angular difference between that angle and an angle of reception associated with a second emitter node different from said first emitter node, and
   selecting the effective angle of reception associated with said first emitter node from among said at least two possible angles of reception as a function of the determined angular differences;
   wherein said step of selecting the effective angle of reception comprises steps of: detecting, among said at least two possible angles of reception, that angle or those angles for which the angular difference with at least one angle of reception associated with said second emitter node is greater than or equal to a predetermined angular threshold; and if at least one possible angle of reception is detected, selecting the effective angle of reception from among said at least one possible angle of reception detected.

2. The method for selecting according to claim 1, wherein said step of selecting said effective angle of reception comprises a step of obtaining, from among said at least two possible angles of reception, that angle for which the angular difference with an angle of reception associated with said second emitter node is the greatest.

3. The method for selecting according to claim 2, wherein the angle of reception associated with said second emitter node enabling the greatest angular difference with the effective angle of reception is also obtained as an effective angle of reception relative to said second emitter node.

4. The method for selecting according to claim 1, wherein said step of determining at least two possible angles of reception comprises steps of:
   obtaining a plurality of pairs of information elements each associating an angle of reception of said directional antenna and a level of signal received by said directional antenna, said pairs of information elements being obtained by performing an angular sweep with said directional antenna;
   building a curve from said pairs of information elements;
   determining at least one local maximum value on said curve, each local maximum value being associated with a pair of information elements; and
   identifying, from among the pair or pairs of information elements corresponding to the determined local maximum values, that pair or those pairs of information elements, which have a received signal level greater than or equal to a predetermined threshold level, the angle of reception associated with each identified information pair constituting a possible angle of reception.

5. A non-transitory computer-readable storage medium, storing a computer program comprising a set of instructions executable by a computer in order to implement a method for selecting an effective angle of reception of a directional antenna of a receiver node, said receiver node belonging to a wireless communications network comprising a plurality of emitter nodes, the method being implemented by the receiver node, the method comprising steps of:
   determining at least two possible angles of reception associated with a first emitter node, each possible angle of reception corresponding to a communication path allowing said receiver node to communicate with said first emitter node; and
   for each of said at least two possible angles of reception, determining an angular difference between that angle and an angle of reception associated with a second emitter node different from said first emitter node, and
   selecting the effective angle of reception associated with said first emitter node from among said at least two possible angles of reception as a function of the determined angular differences;
   wherein selecting the effective angle of reception comprises detecting, among said at least two possible angles of reception, that angle or those angles for which the angular difference with at least one angle of reception associated with said second emitter node is greater than or equal to a predetermined angular threshold; and if at least one possible angle of reception is detected, selecting the effective angle of reception from among said at least one possible angle of reception detected.

6. A receiver node comprising means for selecting an effective angle of reception of a directional antenna of a receiver node, said receiver node belonging to a wireless communications network comprising a plurality of emitter nodes, wherein the receiver node comprises:

means for determining at least two possible angles of reception associated with a first emitter node, each possible angle of reception corresponding to a communication path allowing said receiver node to communicate with said first emitter node, and means for determining, for each of said at least two possible angles of reception, an angular difference between that angle and an angle of reception associated with a second emitter node different from said first emitter node, wherein said means for selecting select the effective angle of reception associated with said first emitter node from among said at least two possible angles of reception as a function of the determined angular differences;

wherein said means for selecting comprise means for detecting, among said at least two possible angles of reception, the angle or angles for which the angular difference with at least one angle of reception associated with said second emitter node is greater than or equal to a predetermined angular threshold, and in that: if at least one possible angle of reception is detected by said detection means, said means for selecting select the effective angle of reception from among said at least one possible angle of reception detected.

7. The receiver node according to claim 6, wherein said means for selecting the effective angle of reception comprise means for obtaining, among said at least two possible angles of reception, that angle for which the angular difference with an angle of reception associated with said second emitter node is the greatest.

8. The receiver node according to claim 7, wherein said means for obtaining obtain, as an effective angle of reception relative to said second emitter node, the angle of reception associated with said second emitter node making it possible to have the greatest possible angular difference with the effective angle of reception.

9. The receiver node according to claim 6, wherein said determining means comprise:

means for obtaining a plurality of pairs of information elements each associating an angle of reception of said directional antenna and a level of signal received by said directional antenna, means for building a curve from said pairs of information elements;

means for determining at least one local maximum value on said curve, each local maximum value being associated with a pair of information elements; and means for identifying, from among the pairs of information elements corresponding to the determined local maximum values, that pair or those pairs of information elements which have a received signal level greater than or equal to a predetermined threshold level, the angle of reception associated with each identified information pair constituting a possible angle of reception.

* * * * *